United States Patent Office 2,999,179
Patented Sept. 5, 1961

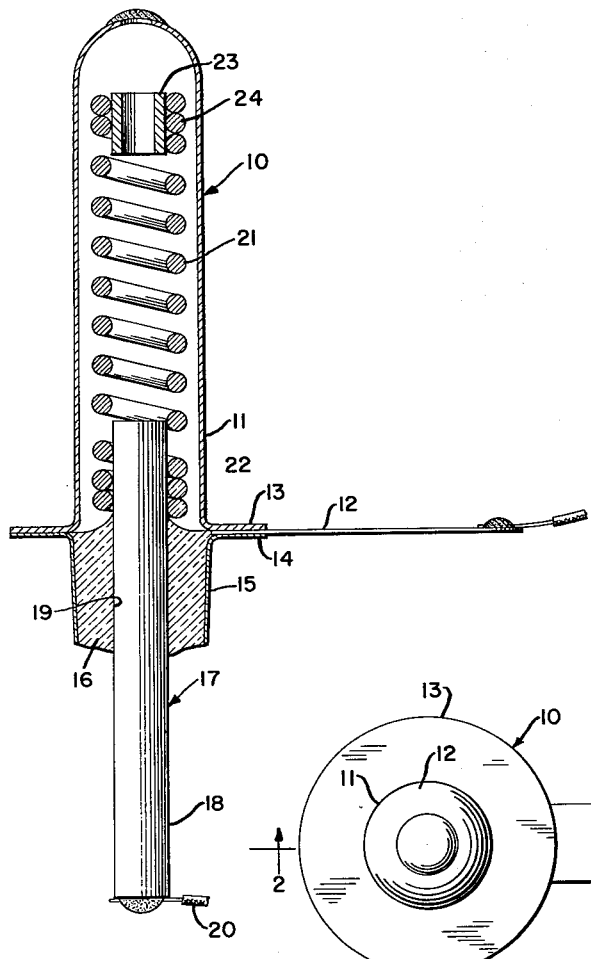
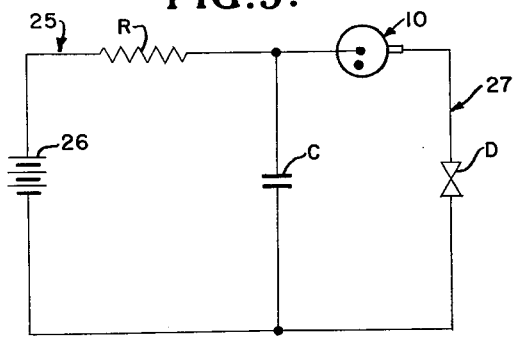

2,999,179
VIBRATION SENSITIVE DIODE
Renato Bianchi, Laurel, and Herbert E. Ruehlemann, Silver Spring, Md., assignors to the United States of America as represented by the Secretary of the Navy
Filed June 28, 1954, Ser. No. 439,940
8 Claims. (Cl. 313—146)
(Granted under Title 35, U.S. Code (1952), sec. 266)

The invention described herein may be manufactured and used by or for the Government of the United States of America for governmental purposes without the payment of any royalties thereon or therefor.

The present invention relates to a gas discharge device and more particularly to a vibrational diode which is highly sensitive to an impulse or other external mechanical force applied thereto whereby the device is rendered conductive as a pendulous anode element thereof is moved in response to such force.

More particularly, the invention provides a new and improved sensitive gas discharge or trigger tube comprising a metallic gas filled envelope or cathode and a rugged vibrational sensitive element electrically insulated from the cathode and constructed and arranged to function as a mechanical resonant system. Moreover, when the aforesaid device is subjected to mechanical forces the pendulous element is oscillated within the gas filled cathode thereby changing the breakdown characteristics of the device, resulting from movement of the element or anode into closer proximate relation with respect to the cathode whereupon the tube is rendered conductive. The diode comprises a sensitive and rugged vibratable sensing element which is operable in response to minute external forces and the output of the diode is independent of any contact resistance such as characterized by the mechanical resonant reed arrangement heretofore employed.

Furthermore, it will be understood that a device constructed in accordance with the present invention when used in an electrical circuit such that the potential across the cathode and diode elements is just below the breakdown voltage when the tube is in an undisturbed condition will be rendered conductive in response to vibrations of the anode or pendulous element. This may be accomplished by several circuit arrangements, if desired, such for example, as by employing a voltage stabilizing circuit before the diode such that the voltage on the condenser included therein will be below the breakdown voltage of the diode or by having a power source charging the condenser of such high impedance that the condenser potential will not exceed the breakdown potential due to the tube leakage current near stabilization. Under such conditions of operation it will be apparent that the diode is self stabilizing for the reason that the condenser voltage is adjusted to slightly below the breakdown voltage of the diode when the tube is at rest. In view of the foregoing, it will be understood that the diode constructed in accordance with the present invention may be advantageously used as a trigger tube for operating a sensitive relay or for initiating an electroresponsive detonator or the like.

An object of the present invention is to provide a new and improved diode which is highly sensitive to vibration and which is of rugged construction.

Another object of the invention is the provision of a gas filled tube structure wherein means responsive to minute vibrations renders the tube conductive.

Still another object of the invention is the provision of a trigger tube having an electroconductive envelope and a pendulous element therein for rendering the tube conductive as the pendulous element is oscillated in response to a minute mechanical force applied thereto.

A further object of the invention is the provision of a gas filled metallic envelope having a pendulous element disposed therein and insulated from the envelope for rendering the tube conductive as the pendulous element vibrates in response to an impulse applied thereto.

A still further object is the provision of a new and improved trigger tube for triggering sensitive relays and electroresponsive detonators as a pendulous element enclosed in the tube envelope is moved from an initial position of rest.

Other objects and many of the attendant advantages of this invention will be readily appreciated as the same becomes better understood by reference to the following detailed description when considered in connection with the accompanying drawings wherein:

FIG. 1 is a plan view of the device constructed in accordance with the present invention;

FIG. 2 is a sectional view taken substantially on the lines 2—2 of FIG. 1; and

FIG. 3 is a circuit arrangement suitable for use with the device of the present invention.

Referring now to the drawing and more particularly to FIGS. 1 and 2 thereof, the numeral 10 generally designates a tube constructed in accordance with the present invention. The tube comprises an electroconductive envelope 11 composed of suitable metallic material and containing an ionisable gas, the envelope 11 constituting a hollow cylindrical cathode element. The element 12 has formed on one end thereof a flange 13 in abutting and sealing engagement with a corresponding flange 14 formed on a hollow nipple 15. An electrical connection to the cathode 11 may be established in any suitable manner as by the terminal 12 and conductor secured thereto as illustrated. As shown on FIG. 2, a plug 16 is disposed within the nipple 15, the plug being composed of any suitable insulating material such, for example, as glass or the like and secured within the nipple by a press fit or by being cemented or bonded thereto.

The anode element of the tube is generally indicated by the reference character 17 and comprises an electrode 18 disposed within a bore 19 formed in the plug 16 and secured therein in any conventional manner. It will be noted on FIG. 2 that one end of the electrode is disposed externally of the envelope thereby to provide an external electrical connection thereto as by the conductor 20, the other end of the electrode being disposed within the envelope and extending a predetermined distance beyond the inner surface of the plug and having a resilient pendulous element 21 secured thereto as at 22. It will also be noted that the pendulous element is illustrated in the form of a coiled spring extending substantially the full length of the cathode 12 and having a weight 23 secured to the free end thereof as at 24 whereupon the resilient element will readily vibrate in response to an impulse or other external force applied thereto since one end of the element is secured rigidly to the electrode 18 and the other end is weighted.

Furthermore, it will be noted on FIG. 2 that the convolutions of the coil spring are normally uniformly spaced from the wall of the cylindrical cathode 12 when the tube is in an undisturbed condition. However, when the tube is subjected to vibration, the pendulous or anode element will oscillate within the gas filled cathode and move toward the cylindrical wall of the cathode, such movement of the anode with respect to the cathode changing the breakdown characteristics of the tube thereby rendering the tube conductive and causing ionization of the gas within the tube.

By the aforesaid tube structure, it will be understood that the tube is adapted to be rendered conductive by a decrease in the internal impedance thereof caused by a decrease in the spacing between the anode and cathode elements when the tube is connected to a source of voltage just below the normal breakdown potential of the tube.

For a more complete understanding of the operational characteristics of the tube, attention is directed to FIG. 3, wherein the reference numeral 25 designates a voltage stabilizing network interposed between a voltage source 26 and including a condenser C which is charged from source 26 through a current limiting resistor R. The source 26 is of such value that the potential on the condenser upon being charged will be of a value slightly below the breakdown potential of the tube in a stabilized non-conductive condition while the tube is at rest. When the tube is subjected to an impulse or to vibrations, however, the pendulous anode of the tube vibrates, changing the breakdown characteristics of the tube and causing the tube to fire and discharge the condenser through detonator D thereby operating the detonator. If desired, a relay may be employed in lieu of the detonator D.

From the foregoing, it will be apparent that the aforesaid diode may be advantageously used as a trigger switch or tube and utilized in numerous circuits requiring trigger action to complete a circuit and initiate the operation of a component or components therein such, for example as a relay or electroresponsive explosive element. Furthermore, the aforesaid diode may be advantageously employed in various stabilizing circuit arrangements such, for example, as the type disclosed and claimed in our copending application, Serial No. 219,302, filed April 4, 1951, titled Timing Device With a Cold Cathode Diode Stabilization Arrangement.

In accordance with the foregoing description it will be apparent to those skilled in the art to which the invention relates that a new and improved sensitive and rugged diode has been devised wherein a pendulous anode element when subjected to a minute impulse or vibrations renders the diode conductive.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A gas filled diode tube of the class disclosed comprising an electroconducting envelope, a base to which the envelope is secured, and a resilient helical pendulous element disposed within said envelope and secured to said base for firing the tube as said pendulous element is vibrated.

2. An electron tube of the class disclosed comprising a conductive envelope, a base to which said envelope is sealed, a support carried by said base and insulated therefrom, and a resilient helical pendulous element disposed within said envelope and having one end thereof secured to said support, said tube being adapted to conduct as said pendulous element is vibrated.

3. An electron discharge device of the class disclosed comprising a conductive envelope forming an electrode thereof, a base to which said envelope is secured, and a resilient helical conductive element forming another electrode, said resilient element being secured at one end to the base and disposed within said envelope and having a weight carried by and secured to the other end thereof.

4. An electron tube comprising a dual electrode structure for passage of electrons therebetween, one of said electrodes being the envelope of said tube, the other of said electrodes being a resilient helical pendulous member having one end secured to said tube and insulated therefrom, a weight carried by and secured to the free end of said member, and an ionizable gas contained with said tube, said resilient member being adapted to change the breakdown characteristics of the tube upon vibration thereof to cause ionization of said gas when the tube is connected to a source of electrical potential.

5. An electron discharge device of the class disclosed comprising a base, a hollow cylindrical cathode carried by said base, a resilient helical pendulous anode disposed within said cathode and having one end secured at the base and a weight carried by the free end thereof, and means sealed to said cathode and insulated therefrom for securing the resilient anode to said base.

6. An electron discharge tube comprising a hollow cylindrical electrode, an ionizable gas contained within said cylindrical electrode, a resilient helical pendulous electrode supported within said cylindrical electrode, means carried by said cylindrical electrode and insulated therefrom for supporting said resilient electrode at one end thereof, said resilient electrode being adapted to change the breakdown characteristics of said tube upon vibrations thereof to cause ionization of said gas when the tube is connected in an electrical energizing circuit, and an inertial mass secured to and carried by the other end of said resilient electrode for causing the resilient electrode to respond to minute vibrations.

7. A diode tube of the class disclosed comprising a conductive envelope, a base, a resilient helical pendulous element disposed within said envelope and having one end thereof secured to said base and insulated from said envelope, said tube being adapted to conduct as said pendulous means is vibrated, and a weight secured to the other end of said pendulous element for rendering the pendulous means responsive to minute vibrations.

8. A gas filled diode comprising a base, an annular cathode rigidly secured to said base, and a vibrational helical pendulous anode carried by the base in equidistant spaced relation to said cathode whereby the tube is fired by movement of the anode relative to said cathode in response to an impulse received by said base.

References Cited in the file of this patent

UNITED STATES PATENTS

| | | |
|---|---|---|
| 1,864,214 | Petty | June 21, 1932 |
| 1,917,418 | Almquist et al. | July 11, 1933 |
| 2,363,531 | Johnson | Nov. 28, 1944 |
| 2,576,100 | Brown | Nov. 27, 1951 |
| 2,579,136 | Anderson | Dec. 18, 1951 |